(12) United States Patent
Falardeau et al.

(10) Patent No.: US 9,396,442 B2
(45) Date of Patent: Jul. 19, 2016

(54) CROSS-CHANNEL CONTENT TRANSLATION ENGINE

(71) Applicant: Nuance Communications, Inc., Burlington, MA (US)

(72) Inventors: Simon Falardeau, Laval (CA); Gerard Nantel, Deux-Montagnes (CA)

(73) Assignee: Nuance Communications, Inc., Burlington, MA (US)

( * ) Notice: Subject to any disclaimer, the term of this patent is extended or adjusted under 35 U.S.C. 154(b) by 274 days.

(21) Appl. No.: 14/057,463

(22) Filed: Oct. 18, 2013

(65) Prior Publication Data
US 2015/0112896 A1  Apr. 23, 2015

(51) Int. Cl.
*G06F 15/18* (2006.01)
*G06N 99/00* (2010.01)
*H04W 4/12* (2009.01)

(52) U.S. Cl.
CPC .............. *G06N 99/005* (2013.01); *H04W 4/12* (2013.01)

(58) Field of Classification Search
None
See application file for complete search history.

(56) References Cited

U.S. PATENT DOCUMENTS

| | | | |
|---|---|---|---|
| 2007/0069973 A1* | 3/2007 | Gerbacia | G09F 15/00 345/1.1 |
| 2008/0235024 A1 | 9/2008 | Goldberg et al. | |
| 2008/0255850 A1 | 10/2008 | Cross et al. | |
| 2010/0088438 A1* | 4/2010 | Udell | G06F 13/4221 710/52 |
| 2014/0337790 A1* | 11/2014 | Kim | G06F 3/0482 715/781 |
| 2015/0120278 A1* | 4/2015 | Waibel | G06F 17/24 704/2 |

FOREIGN PATENT DOCUMENTS

WO   WO 03/021796 A2   3/2003

OTHER PUBLICATIONS

Bickmore, T.W., "Relational Agents: Effecting Change through Human-Computer Relationships," Retrieved from Internet Dec. 15, 2014 http://affect.media.mit.edu/pdfs/03.bickmore-phd.pdf.
Taddei, L., et al., "The NESPOLE! Multimodal Interface for Cross-lingual Communication—Experience and Lessons Learned," Proceedings of the Fourth IEEE International Conference on Multimodal Interfaces, Oct. 14-16, 2002.
Duarte, C., "Design and Evaluation of Adaptive Multimodal Systems," Retrieved from the Internet Dec. 15, 2014 http://repositorio.ul.pt/bitstream/10451/1690/1/3709_Tese_PhD_Carlos_Duarte.pdf.

* cited by examiner

*Primary Examiner* — Li-Wu Chang
(74) *Attorney, Agent, or Firm* — Hamilton, Brook, Smith & Reynolds, P.C.

(57) ABSTRACT

An embodiment according to the present invention addresses reusability and alignment of content across channels in a multi-channel virtual assistant, by allowing users to define content on one channel and then have the content fully or partially translated for the other channels using a mix of pre-defined static rules, dynamic rules or machine learning. Content translation is provided based on communications channels, and content translation is performed from one to many formats, optionally in real time. Performing content translation using machine learning provides an advantage that as users work, content translation becomes more precise and covers more elements.

18 Claims, 5 Drawing Sheets

CROSS-CHANNEL CONTENT TRANSLATION ENGINE

BACKGROUND OF THE INVENTION

Some multi-channel virtual assistants offer the same user interaction and content across Web, SMS, IVR, Mobile and other channels. Such content needs to be adapted according to the channel. Conventionally, the content is not easily expanded to cover new elements.

SUMMARY OF THE INVENTION

An embodiment according to the present invention addresses reusability and alignment of content across channels in a multi-channel virtual assistant by allowing users to define content on one channel and then have the content fully or partially translated for the other channels using a mix of pre-defined static rules, dynamic rules or machine learning. Content translation is provided based on communications channels and is performed from one to many formats, optionally in real time. Performing content translation using machine learning provides an advantage that as users work, content translation becomes more precise and covers more elements.

In accordance with an embodiment of the invention, there is provided a system for content translation. The system comprises a translation module configured to receive, from a user interface, user entered content to provide a first end user experience suitable to be presented over a first type of communications channel; and a knowledge base comprising at least one translation configuration to translate the user entered content into analogous content to provide at least one other end user experience suitable to be presented over at least one respective different type of communications channel. The translation module is configured to consult the knowledge base to translate the user entered content into the analogous content, and to provide the analogous content to the user interface to be associated with the user entered content over the user interface.

In further, related embodiments, each of the first type of communications channel and the at least one different type of communications channel may comprise at least one of: a web channel; a mobile channel; a text message channel; an e-mail channel; and an interactive voice response channel. The translation module may be still further configured to provide the analogous content, to the user interface to be associated with the user entered content over the user interface, automatically in real time as the user entered content is entered by the user; and/or automatically in response to a single user gesture over the user interface. The at least one translation configuration of the knowledge base may comprise at least one static translation configuration and/or at least one dynamically learned translation configuration. The system may further comprise a learning module configured to provide the at least one dynamically learned translation configuration to the knowledge base based on at least one user interaction received from the user interface. The system may further comprise the user interface, wherein the user interface is configured to provide the user entered content to the translation module and to receive the analogous content from the translation module.

In other, related embodiments, the user interface may comprise a plurality of display interfaces including a base display interface and at least one non-base display interface. The translation module may be configured to consult the knowledge base to translate at least a user changed portion of content into at least a portion of corresponding analogous content whenever a content change is made over the base display interface, and may be configured not to make a display change over the base display interface when a change is made over the at least one other non-base display interfaces. In another embodiment, the user interface may comprise a plurality of display interfaces, and the translation module may be configured to consult the knowledge base to translate at least a user changed portion of content into at least a portion of corresponding analogous content whenever a content change is made over any of the plurality of display interfaces. At least one of the first type of communications channel and the at least one different type of communications channel may comprise a visual type of communications channel; and at least one of the first type of communications channel and the at least one different type of communications channel may comprise an audio type of communications channel.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
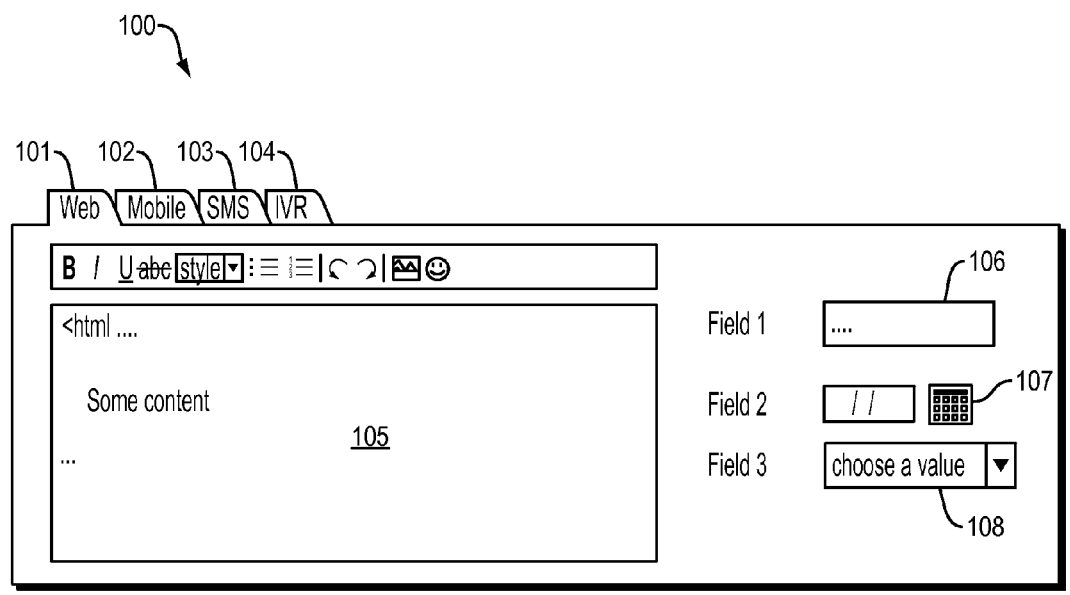
FIG. 1A is a diagram of a multi-channel user interface for content translation in accordance with an embodiment of the invention.

A description of example embodiments of the invention follows.

A useful aspect for users to benefit when investing in a multi-channel virtual assistant is to be able to streamline content creation across the channels and maintain alignment when changes are needed.

An embodiment according to the present invention addresses reusability and alignment of content across channels by allowing users to define content on one channel and then, have the content fully or partially translated for the other channels using a mix of pre-defined static rules, dynamic rules or machine learning. Content translation is provided based on communications channels, and is performed from one to many formats in real time. Performing content translation using machine learning provides an advantage that as users work, content translation becomes more precise and covers more elements.

A multi-channel virtual assistant in accordance with an embodiment of the invention provides human/machine dialogs across channels. A cross channel virtual assistant offers a consistent and rich user experience through Interactive Voice Response (IVR), Web, Text Messaging (such as Short Message Service or "SMS" messaging), Mobile and other communications channels. To make this solution attractive and worthwhile for users, it is useful to maximize reusability at application and content levels.

For a typical virtual assistant, "content" comprises information to send to the end user in different formats.

For example, content may include prompts to invite the user to articulate a question or a desired action. Prompts can be text and/or audio with or without visual artifacts. Text in prompts can be formatted (for example, in a Hyper Text Markup Language or HTML format), such as when presented on a web channel, or can be plain text, such as for text messaging (e.g., SMS).

Content may also, for example, include additional questions to the end user to better understand the request (such as a disambiguation or a step by step dialog). The additional questions can be text and/or audio with or without visual artifacts. The text of the additional questions can be formatted (for example, HTML), such as when presented on a web channel. The additional questions can include clickable answers, Uniform Resource Locators (URLs) or choices in the form of text or audio.

Content may also include transaction dialogs to complete a given task, for example, to pay a bill. The transaction dialogs may include a combination of prompts and additional questions, for example of the types described above.

Content may also include answers or transaction results, which may include any of the foregoing forms of content.

Typically, content is not readily usable across different channels. For example, SMS can only contain text limited in length; pure audio IVR cannot provide visual artifacts, clickable choices or text; and mobile has limited space to display information.

An embodiment according to the present invention addresses reusability of content by allowing users to define content on one channel and then, have the content fully or partially translated for the other channels using a mix of pre-defined static rules, dynamic rules and machine learning. Users can define and maintain content for one channel and streamline the creation/reuse of content for other channels, while also ensuring that the content is viable for each channel.

FIG. 1A is a diagram of a multi-channel user interface for content translation in accordance with an embodiment of the invention. An embodiment according to the invention comprises a graphical user interface (GUI) 100 for editing and reading channel specific content, and a backend translation engine 120 (see FIG. 1B) for translating content. In the graphical user interface 100 of FIG. 1A, a user writes content on one tab 101, for a given channel (here, for example, the web channel 101). Automatic translation takes place either in real time as content is written or after the user presses a button (or provides another user gesture) to launch the translation process. On each of the other tabs 102, 103 and 104, the user is shown the automatic content translation that was performed and can accept it, reject it and/or make changes.

In the embodiment of FIG. 1A, the GUI comprises several tabs or pages 101-104. Each represents the same content, but adapted to the channel. The GUI tabs 101-104 are all linked together by a translation and learning engine, so that when content is edited for any of the channels, it is translated and adapted for all other channels simultaneously. When a user enters a tab for which automatic translation was done, all modifications are highlighted and can be accepted or rejected over the GUI one by one or all together by the user. The GUI 100 may also be configured to allow one or more "tabs" to act as masters or base display interfaces, meaning that their content is not impacted by changes to other tabs (no automatic translation/adaptation), and that only changes on the master tabs trigger an automated translation process on non-master tabs. For example, a user could set the web tab 101 as a master tab, so that changes made on that tab 101 would trigger translation/adaption on all other tabs, but changes on any other tab 102-104 would not trigger changes on the web tab 101.

In the embodiment of FIG. 1A, an automated translation may be triggered for any given tab based on any other tab. For example, a user can select the mobile tab 102 and request an automated translation with data originating from the IVR tab 104. Any such combination can be supported. In addition, the content can be represented for display and editing using one or more GUI components, such as, without limitation: a rich text and/or plain text area 105, a text input field 106, a date field 107 or a fixed selection 108.

Figure 1B:
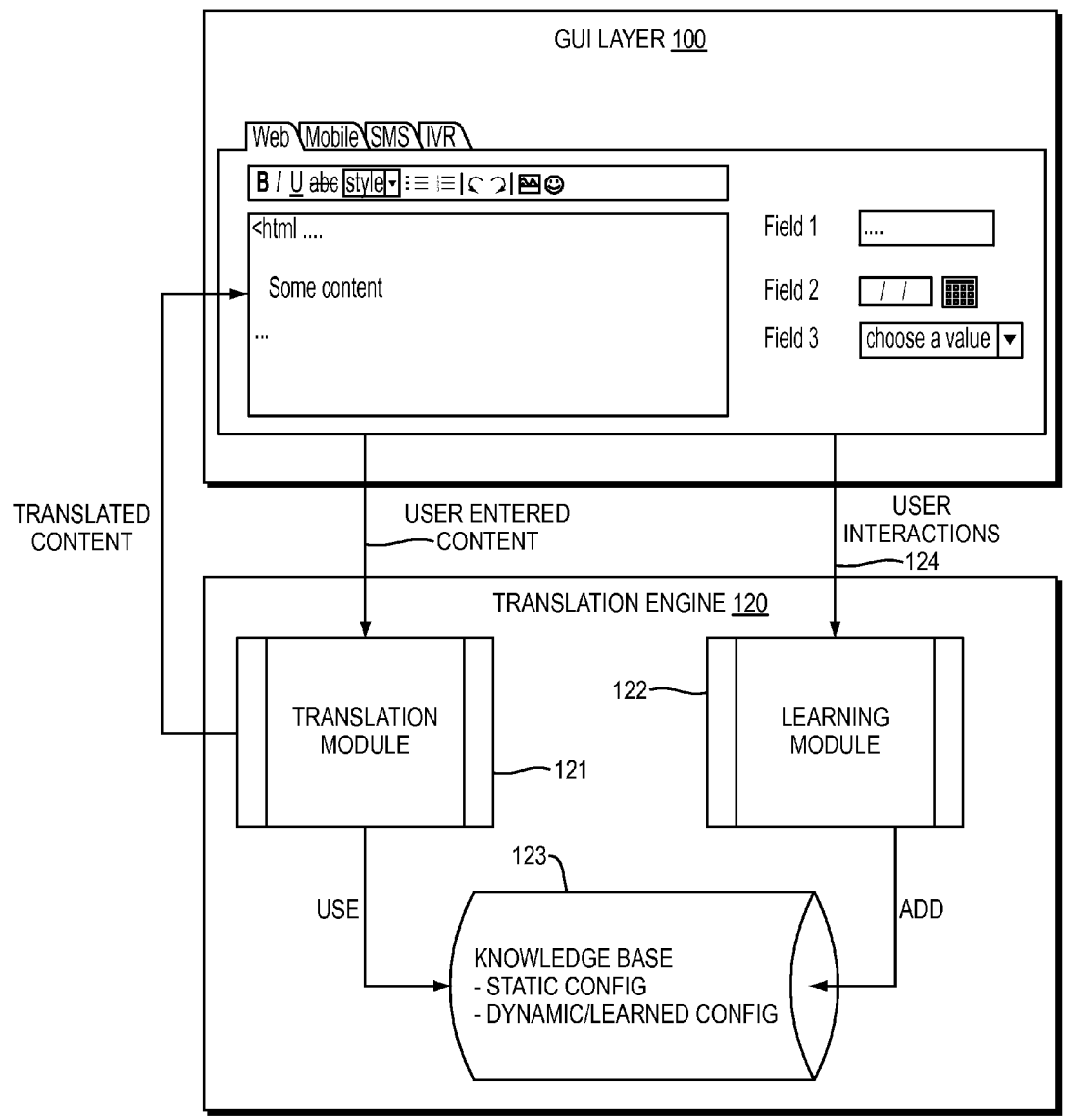
FIG. 1B is a schematic diagram of components of a system for content translation in accordance with an embodiment of the invention.

FIG. 1B is a schematic diagram of components of a system for content translation in accordance with an embodiment of the invention. A translation engine 120 comprises a translation module 121, a learning module 122, and a knowledge base 123. The translation module 121 is responsible for getting the content, translating it using the knowledge base 123 and sending it back to the GUI 100. This is done for all other channels (e.g., 102-104 of FIG. 1A) when one of the channels is modified (e.g., 101 of FIG. 1A). The learning module 122 is responsible for capturing user interactions 124 (such as accept, reject and modify), analyzing the data in order to learn from it and pushing the result into the knowledge base 123 in a format consumable by the translation engine. The translation engine 120 registers user actions 124 in order to learn from them and better predict translation for future content. Translation configuration and learning can be segmented by one or more attributes, such as by project. Translation configuration and learning can also use third party system access to complete translations. For example, contact information may be fetched from a third party system to translate a URL to a phone number.

In the embodiment of FIG. 1B, the knowledge base 123 can include two main sources for performing translations: a static configuration and a dynamic configuration. Static configurations do not change based on user interactions, whereas dynamic configurations do.

As an example of a static configuration, a static configuration rule for converting content to SMS may comprise stripping all other content except text; and a static configuration rule for converting content to IVR may comprise converting all text to audio prompt content.

In a learning or dynamic configuration in the embodiment of FIG. 1B, user interactions, such as when accepting, rejecting or adjusting proposals, are kept and used to predict proper translations for future content. Data may be used in a statistical manner or in a direct correlation. Further, grammars may be used to permit user-defined dynamic rules to be created.

Example 1 of Learning Configuration:
 a) User interaction translates url 1 from web channel into some specific text for the SMS channel.
 b) User interaction translates url 1 from web channel into call transfer to a specific number on the IVR channel.
 c) Learning configuration uses changes (a) and (b) for future translations.

Additionally, the fact that a URL becomes (i) text in SMS and (ii) a phone number in IVR, is used in general for translating URLs, using the learning configuration. At some point, a different URL can be translated into something else than a phone number under IVR. As such operations occur, the translation engine keeps data and learns from it, in the learning configuration.

Example 2 of Learning Configuration:

A list of URLs from the web channel is translated into a list in other channels; for example, into prompts asking the user for options, or into SMS options to send back.

In another example in the learning or dynamic configuration in the embodiment of FIG. 1B, URL patterns can be analyzed and used to predict the outcome of a translation into another channel, using any element from the URL. Some examples of translations based on URL domains follow. In these, any part of a mixed part of the domain may be used. Examples:

a) Domain 1 can be translated into a specific phone number b) Domain 2 can be translated into a phone number, but not a known phone number; for example, the user can be guided by proposing a generic phone number upon the translation, such as a generic phone number of format x-xxx-xxx-xxxx, instead of keeping the URL in the translation.

c) Domain 3 can be translated into a specific prompt in the IVR channel.

In accordance with an embodiment of the invention, "presentation" content may be translated from one to multiple channels mixing audio and visual, such as SMS, IVR, mobile and web. Additionally, a combination of a static pre-set configuration and dynamic/machine learning may be used for the cross channel translation. The content may be translatable from any channel to all other channels.

As used herein, a "communications channel" comprises a distinct type of communication technique having a corresponding distinct user experience. For example, text messaging, IVR, mobile and web channels are examples of distinct communications channels. In addition, however, two distinct communications channels may be simply different facets of a common type of communication, such as a web presentation for different devices. For example a web channel for display on a tablet device may be considered a separate communications channel from a web channel for display on a phone. Further, multiple mobile channels may be considered distinct communications channels where they are directed to displays on different types of mobile devices, for example mobile devices having different operating systems.

In addition, as used herein, "content" that is translated may include not only primary content, but also metadata and the data "wrapper." For example, plain text on one channel may be changed into bold face text on another channel, or vice versa. In another example, metadata may be removed or modified when translated from channel to channel.

Figure 1C:
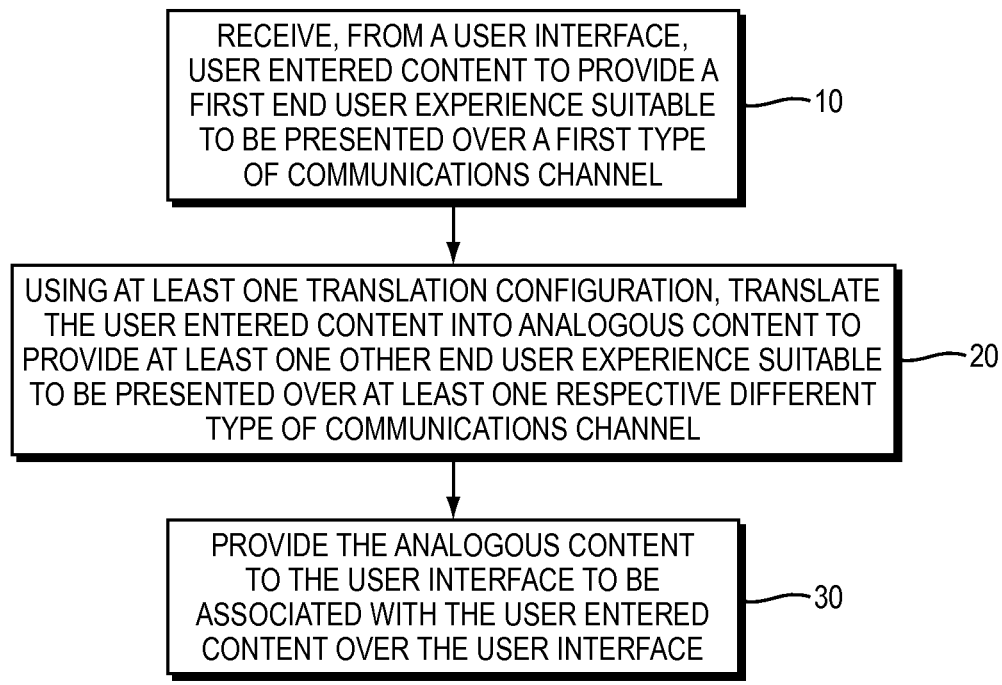
FIG. 1C is a block diagram of a method implemented by a system in accordance with an embodiment of the invention.

FIG. 1C is a block diagram of a method implemented by a system in accordance with an embodiment of the invention. The method comprises receiving 10, from a user interface, user entered content to provide a first end user experience suitable to be presented over a first type of communications channel. The user entered content is translated 20 into analogous content to provide at least one other end user experience suitable to be presented over at least one respective different type of communications channel. The translating uses at least one translation configuration. The analogous content is provided 30 to the user interface to be associated with the user entered content over the user interface. It will be appreciated that related methods may be implemented in accordance with teachings herein.

Figure 2:
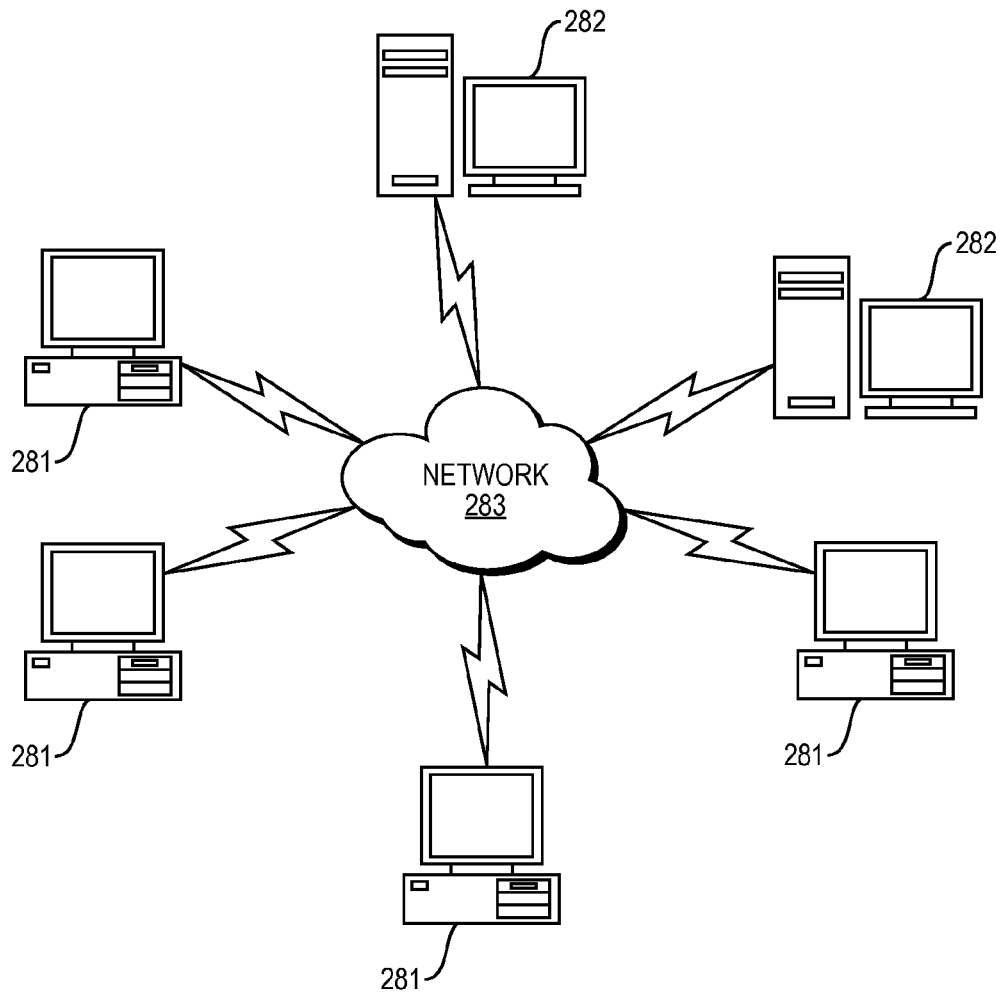
FIG. 2 illustrates a computer network or similar digital processing environment in which the present invention may be implemented.

FIG. 2 illustrates a computer network or similar digital processing environment in which the present invention may be implemented. Client computer(s)/devices 281 and server computer(s) 282 provide processing, storage, and input/output devices executing application programs and the like. Client computers 281 can include, for example, the computers used to implement a graphical user interface 100, in accordance with an embodiment of the invention; and server computers 282 can be used to implement a translation engine 120, in accordance with an embodiment of the invention. Client computer(s)/devices 281 can also be linked through a communications network 283 to other computing devices, including other client devices/processes 281 and server computer(s) 282. The communications network 283 can be part of a remote access network, global network (e.g., the Internet), worldwide collection of computers, Local area or Wide area networks, and gateways that currently use respective protocols (TCP/IP, Bluetooth, etc.) to communicate with one another. Other electronic device/computer network architectures are suitable.

Figure 3:
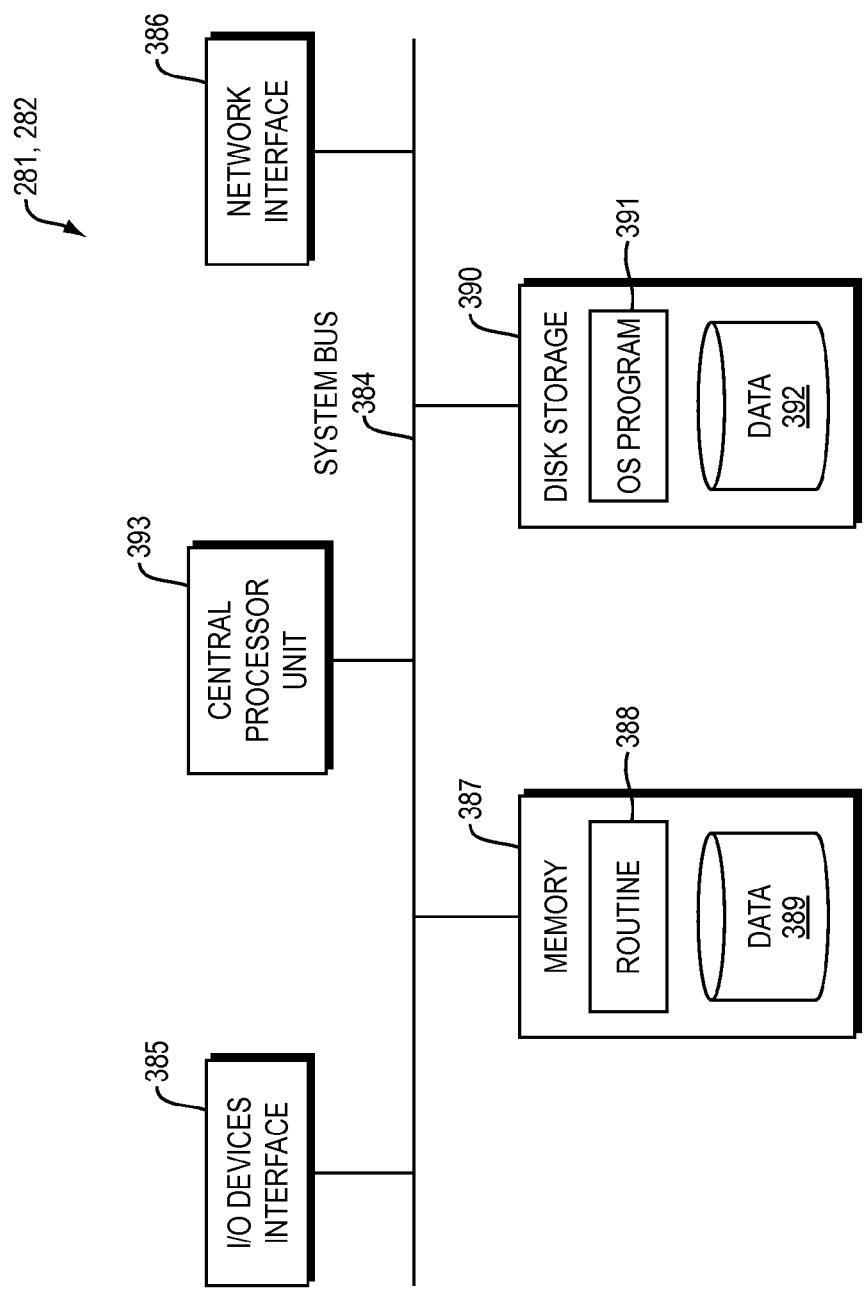
FIG. 3 is a diagram of an example internal structure of a computer in the computer system of FIG. 2, in accordance with an embodiment of the invention.

FIG. 3 is a diagram of an example internal structure of a computer (e.g., client processor/device 281 or server computers 282) in the computer system of FIG. 2, in accordance with an embodiment of the invention. Each computer 281, 282 contains a system bus 384, where a bus is a set of hardware lines used for data transfer among the components of a computer or processing system. The system bus 384 is essentially a shared conduit that connects different elements of a computer system (e.g., processor, disk storage, memory, input/output ports, network ports, etc.) that enables the transfer of information between the elements. Attached to the system bus 384 is an I/O device interface 385 for connecting various input and output devices (e.g., keyboard, mouse, displays, printers, speakers, etc.) to the computer 281, 282. A network interface 386 allows the computer to connect to various other devices attached to a network (e.g., the network 283 of FIG. 2). Memory 387 provides volatile storage for computer software instructions 388 and data 389 used to implement an embodiment of the present invention (e.g., routines for content translation). A disk storage 390 provides non-volatile storage for computer software instructions 391 and data 392 used to implement an embodiment of the present invention. A central processor unit 393 is also attached to the system bus 384 and provides for the execution of computer instructions.

A system in accordance with the invention has been described in which there is provided content translation. Components of such a system, for example components of a translation module, learning module, knowledge base, user interface and other systems described herein may, for example, be a portion of program code, operating on a computer processor.

Portions of the above-described embodiments of the present invention can be implemented using one or more computer systems, for example to perform content translation. For example, the embodiments may be implemented using hardware, software or a combination thereof. When implemented in software, the software code can be stored on any form of non-transient computer-readable medium and loaded and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, at least a portion of the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention described above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a non-transient computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer system for content translation, the computer system comprising:
   at least one processor operatively coupled to computer memory, the at least one processor configured to include:
   a user interface comprising a plurality of display interfaces including a base display interface and at least one non-base display interface;
   a translation module configured to receive, from the user interface, user entered content to provide a first end user experience of an end user, the user entered content formatted as suitable to be presented over a first type of communications channel to provide the first end user experience;
   a knowledge base comprising at least one translation configuration to translate the user entered content into analogous content to provide at least one other end user experience of the end user, the analogous content formatted as suitable to be presented over at least one respective different type of communications channel to provide the at least one respective other end user experience;
   the translation module being further configured to consult the knowledge base to translate the user entered content into the analogous content;
   the translation module being still further configured to provide the analogous content to the user interface to be associated with the user entered content over the user interface; and
   the translation module being yet further configured to consult the knowledge base to translate at least a user changed portion of content into at least a portion of corresponding analogous content whenever a content change is made over the base display interface, and not to make a display change over the base display interface when a content change is made over the at least one non-base display interface.

2. The computer system of claim 1, wherein each of the first type of communications channel and the at least one different type of communications channel comprises at least one of: a web channel; a mobile channel; a text message channel; an e-mail channel; and an interactive voice response channel.

3. The computer system of claim 1, the translation module being still further configured to provide the analogous content in at least one of the following manners: (i) automatically in real time as the user entered content is entered by the user; and (ii) automatically in response to a single user gesture over the user interface.

4. The computer system of claim 1, wherein the at least one translation configuration of the knowledge base comprises at least one static translation configuration.

5. The computer system of claim 1, wherein the at least one translation configuration of the knowledge base comprises at least one dynamically learned translation configuration.

6. The computer system of claim 5, further comprising a learning module configured to provide the at least one dynamically learned translation configuration to the knowledge base based on at least one user interaction received from the user interface.

7. The computer system of claim 1, further comprising the user interface, wherein the user interface is configured to provide the user entered content to the translation module and to receive the analogous content from the translation module.

8. The computer system of claim 1, wherein the user interface comprises a plurality of display interfaces, and wherein the translation module is configured to consult the knowledge base to translate at least a user changed portion of content into at least a portion of corresponding analogous content whenever a content change is made over any of the plurality of display interfaces.

9. The computer system of claim 1, wherein at least one of the first type of communications channel and the at least one different type of communications channel comprises a visual type of communications channel;
and wherein at least one of the first type of communications channel and the at least one different type of communications channel comprises an audio type of communications channel.

10. A method for content translation, the method comprising:
receiving, from a user interface, user entered content to provide a first end user experience of an end user, the user entered content formatted as suitable to be presented over a first type of communications channel to provide the first end user experience, wherein the user interface comprises a plurality of display interfaces including a base display interface and at least one non-base display interface;
translating the user entered content into analogous content to provide at least one other end user experience of the end user, the analogous content formatted as suitable to be presented over at least one respective different type of communications channel to provide the at least one respective other end user experience, the translating using at least one translation configuration;
providing the analogous content to the user interface to be associated with the user entered content over the user interface; and
translating at least a user changed portion of content into at least a portion of corresponding analogous content whenever a content change is made over the base display interface, and not making a display change over the base display interface when a content change is made over the at least one non-base display interface.

11. The method of claim 10, wherein each of the first type of communications channel and the at least one different type of communications channel comprises at least one of: a web channel; a mobile channel; a text message channel; an e-mail channel; and an interactive voice response channel.

12. The method of claim 10, comprising providing the analogous content automatically in real time as the user entered content is entered by the user.

13. The method of claim 10, comprising providing the analogous content automatically in response to a single user gesture over the user interface.

14. The method of claim 10, wherein the translating using the at least one translation configuration comprises using at least one static translation configuration.

15. The method of claim 10, wherein the translating using the at least one translation configuration comprises using at least one dynamically learned translation configuration generated based on at least one user interaction received from the user interface.

16. The method of claim 10, wherein the user interface comprises a plurality of display interfaces, the method further comprising translating at least a user changed portion of content into at least a portion of corresponding analogous content whenever a content change is made over any of the plurality of display interfaces.

17. The method according to claim 10, wherein at least one of the first type of communications channel and the at least one different type of communications channel comprises a visual type of communications channel;
and wherein at least one of the first type of communications channel and the at least one different type of communications channel comprises an audio type of communications channel.

18. A non-transient computer-readable storage medium having computer-readable code stored thereon, which, when loaded and executed by a computer processor, causes the computer processor to translate content, by causing the processor to:
receive, from a user interface, user entered content to provide a first end user experience of an end user, the user entered content formatted as suitable to be presented over a first type of communications channel to provide the first end user experience, wherein the user interface comprises a plurality of display interfaces including a base display interface and at least one non-base display interface;
translate the user entered content into analogous content to provide at least one other end user experience of the end user, the analogous content formatted as suitable to be presented over at least one respective different type of communications channel to provide the at least one respective other end user experience, the translating using at least one translation configuration;
provide the analogous content to the user interface to be associated with the user entered content over the user interface; and
translate at least a user changed portion of content into at least a portion of corresponding analogous content whenever a content change is made over the base display interface, and not make a display change over the base display interface when a content change is made over the at least one non-base display interface.

* * * * *